Figure 1:
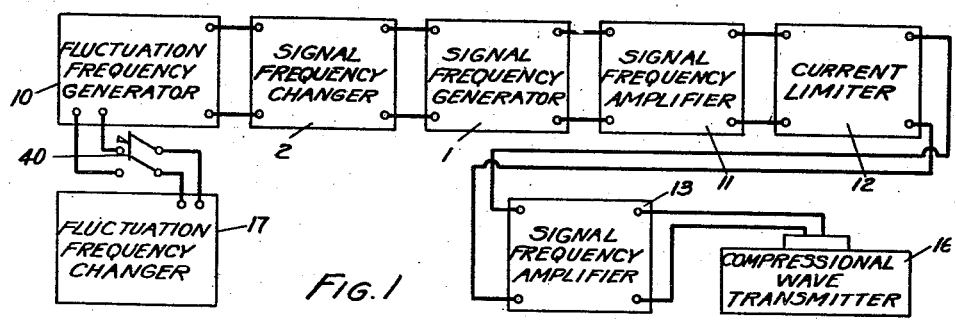

Dec. 30, 1947.  B. M. HARRISON  2,433,361
METHOD AND APPARATUS FOR ECHO RANGING
Filed Jan. 20, 1940  4 Sheets-Sheet 1

INVENTOR.
Bertram M. Harrison
BY
ATTORNEY.

Dec. 30, 1947.    B. M. HARRISON    2,433,361
METHOD AND APPARATUS FOR ECHO RANGING
Filed Jan. 20, 1940    4 Sheets—Sheet 2

INVENTOR.
Bertram M. Harrison
BY Ezekiel Wolf
ATTORNEY.

Dec. 30, 1947.   B. M. HARRISON   2,433,361
METHOD AND APPARATUS FOR ECHO RANGING
Filed Jan. 20, 1940    4 Sheets-Sheet 3

INVENTOR.
Bertram M. Harrison
BY
ATTORNEY.

Dec. 30, 1947.      B. M. HARRISON      2,433,361

METHOD AND APPARATUS FOR ECHO RANGING

Filed Jan. 20, 1940      4 Sheets-Sheet 4

INVENTOR.
BERTRAM M. HARRISON
BY
ATTORNEY

Patented Dec. 30, 1947

2,433,361

UNITED STATES PATENT OFFICE 2,433,361

METHOD AND APPARATUS FOR ECHO RANGING

Bertram M. Harrison, Newton Highlands, Mass., assignor, by mesne assignments, to Submarine Signal Company, Boston, Mass., a corporation of Delaware Application January 20, 1940, Serial No. 314,803

32 Claims. (Cl. 177—386)

The present invention relates to echo ranging with underwater compressional waves.

Echo ranging systems have heretofore been used in which a submarine compressional wave impulse is transmitted into the water toward a reflecting object, the reflected impulse being received and the time interval measured between the transmitted and reflected impulses whereby the distance of the reflecting object is determined.

In my prior applications Serial Nos. 174,081, filed November 11, 1937, 231,390 and 231,391, filed September 23, 1938, now patents numerals 2,410,066, 2,410,067, and 2,407,270, respectively, I have disclosed methods and apparatus for underwater echo ranging in which the transmitted signal impulse is varied in frequency once over a predetermined frequency band. By this means the effect upon the receiver of certain reverberations and other noises was greatly reduced.

The present invention provides an even greater improvement in the reduction of reverberations and the disturbing noises and thereby extends the range at which reflecting objects can be detected and reduces the fatigue of operation.

According to the present invention the transmitted compressional wave signal impulse is varied continuously in frequency back and forth between predetermined frequency limits which may be approximately plus or minus 20% of the mean frequency. This entire frequency band is preferably in the supersonic range. The fluctuation frequency, that is the number of times per second that the transmitted signal completes a cycle of frequency change between the said limits, is preferably of an audio frequency high enough to make possible a considerable number of complete frequency fluctuation cycles during the time length of the transmitted impulse. The received signal reflected from distant objects will, of course, likewise continuously fluctuate in frequency. The frequency fluctuations of the received signal are then detected to produce an audio frequency signal whose frequency is equal to or proportional to the rate of frequency fluctuation of the transmitted impulse, the said audio frequency signal being used to produce an indication. By measuring the time interval between transmitted and reflected impulses the distance of the reflecting object is, of course, determined. By using a directional wave receiver, the direction of the object can also be ascertained. Usually the compressional wave signal is transmitted periodically in synchronism with a timing device, the reflected signals being likewise periodically received and used to actuate an aural or visual indicator.

Figure 2:
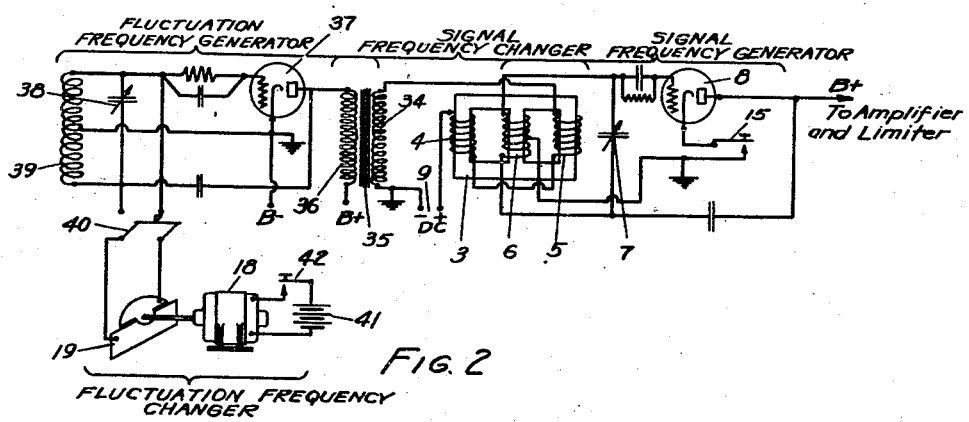
Figure 3:
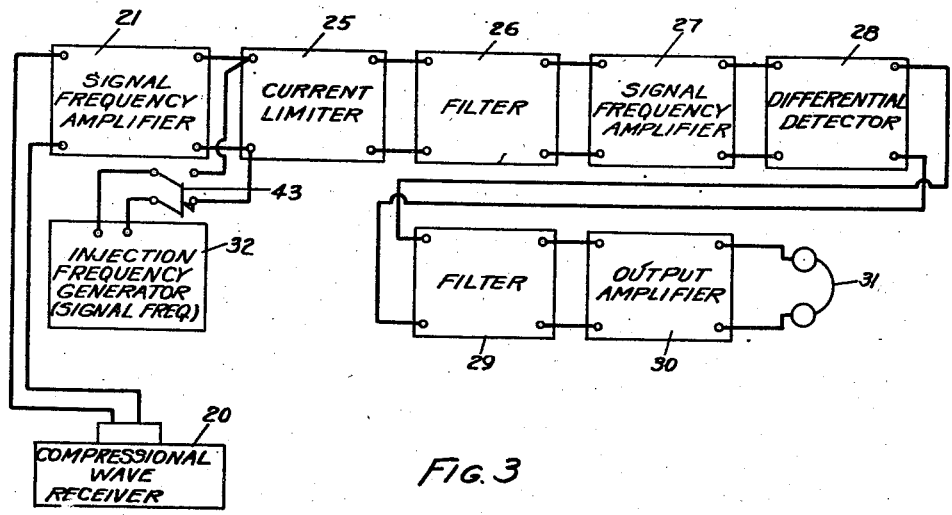
Figure 7:
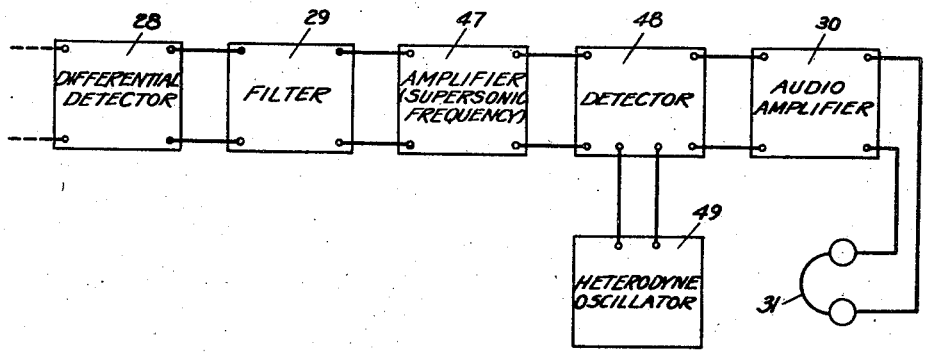
Figure 8:
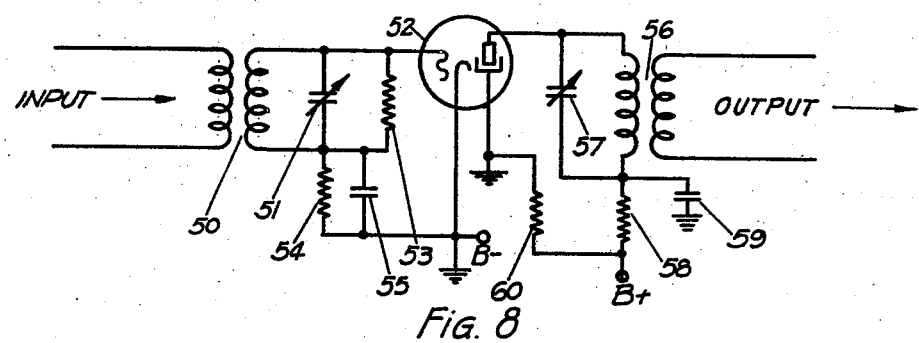
Figure 9:
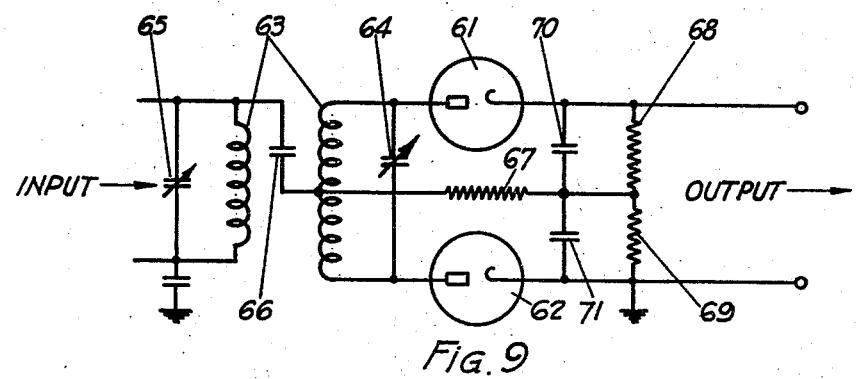
Figure 10:
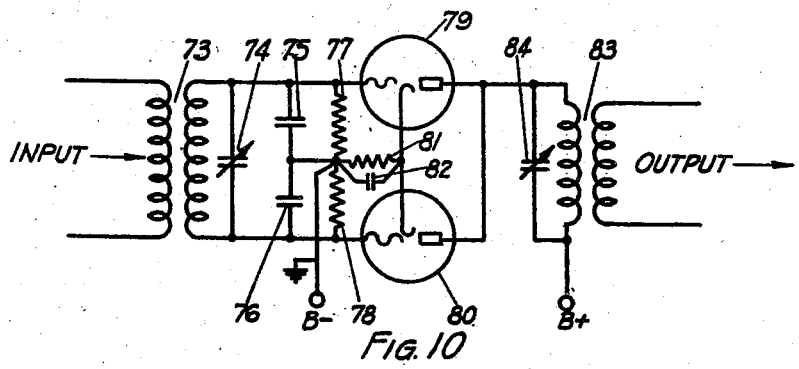

My invention will best be understood from the following description taken in connection with the accompanying drawings in which Fig. 1 is a functional diagram of the apparatus for transmitting the impulse of continuously fluctuating frequency; Fig. 2 is a schematic diagram of a portion of the apparatus shown in Fig. 1; Fig. 3 is a functional diagram of a simple form of receiving system; Figs. 4, 5, 6 and 7 are functional diagrams of modifications of the receiving system shown in Fig. 3; Fig. 8 is a schematic diagram of a representative current limiter circuit; Fig. 9 is a schematic diagram of a representative differential detector; and Fig. 10 is a schematic diagram of a representative frequency multiplier.

A signal frequency generator functionally shown at 1 in Fig. 1 has its frequency varied continuously back and forth between predetermined fixed frequency limits defining a frequency band having an extent of approximately plus or minus 20% of the mean frequency. This may be accomplished by a frequency changer 2 controlled by a fluctuation frequency generator 10 whose frequency may, in turn, be varied by the fluctuation frequency changer 17. The above apparatus may be of any suitable form. By way of example, it may have the form shown in Fig. 2. The signal frequency generator 1 may, for example, consist of a conventional vacuum tube oscillator 8 having a tuned grid circuit consisting of the condenser 7 which is in parallel with an inductance 6. The inductance 6 forms part of the signal frequency changer 2 which may consist of a closed magnetic core 3 having two end legs and a central leg upon which are wound coils 4, 5 and 6, respectively. Since the coil 6 forms part of the tuned circuit controlling the grid of the oscillator tube 8, the frequency of the latter can be varied by varying the inductance of the coil 6. This is accomplished by varying the permeability of the core 3. To this end the coils 4 and 5 are connected in series aiding with each other but magnetically opposed with respect to coil 6. The coils 4 and 5 are also connected in series with a direct current source 9 and secondary winding 34 of transformer 35. Flow of current from the direct current source through the coils 4 and 5 is controlled by the fluctuation frequency generator. This may consist of any suitable form of vacuum tube oscillator having usually a substantially constant audio frequency, for example, 1000 cycles per second. Other frequencies including supersonic may, however, also be used.

The fluctuation frequency generator may consist, for example, of the vacuum tube 37. The grid circuit of tube 37 contains the customary tuning condenser 38 and inductance 39. The output current of tube 37 passes through the primary 36 of the transformer 35. Therefore, an alternating current of the oscillator frequency, say 1000 cycles per second, will flow through coils 4 and 5, thereby changing the permeability of the core 3 and consequently changing the inductance of coil 6 between predetermined values depending upon the magnetic and electric constants which are involved. This change of inductance of the coil 6 will occur at the frequency of the fluctuation frequency generator. Consequently the resonant frequency of the tuned circuit for the oscillator tube 8 and the output current of the tube 8, that is of the signal frequency generator, will vary between predetermined frequency limits at a rate determined by the frequency of the fluctuation frequency generator. The output current can be controlled as to length of transmitted impulse by means of the key 15 which may be a hand key or any suitable form of automatic key well known in the art of echo ranging.

Referring again to Fig. 1, the signal frequency generator 1 thus produces an electric impulse whose frequency is continuously fluctuating between upper and lower limits both of which preferably lie in the supersonic range. This signal impulse may be amplified by the signal frequency amplifier 11 after which it is passed through a current limiter 12 which limits the maximum value of the oscillations so that the impulses will have substantially uniform amplitude and will vary only in frequency. After further amplification by the signal frequency amplifier 13 the impulses are conducted to the compressional wave transmitter 16. The latter may be of any suitable type but it should be noted that it must, of course, be capable of producing compressional waves varying in frequency throughout the frequency range of the current supplied to it by the signal frequency generator 1. For example, a Rochelle salt transmitter may be used.

As will hereafter appear, it may be desirable not only to vary the frequency of the transmitted signal but also to vary the rate of frequency fluctuation of the transmitted signal. This may be accomplished by means of a fluctuation frequency changer 17 which may, for example, take the form shown in Fig. 2. By closing the switch 40 the condenser 38 in the tuned circuit of the fluctuation frequency generator tube 37 has an additional capacitor 19 connected in parallel with it. The condenser 19 is shown as a rotary condenser which may be rotated by motor 18 operated by the battery 41 with the aid of key 42. Rotation of the motor 18 through a complete revolution or a part of a revolution will thus cause the frequency of the current produced by tube 37 to change between predetermined limits. Consequently the effective inductance of the coil 6 in the signal frequency changer is varied between the predetermined limits at a variable rate. The output of the signal frequency generator, therefore, not only fluctuates in frequency but continuously changes its rate of frequency fluctuation.

In using the fluctuation frequency changer 17 it is contemplated that the keying device 42 for the operation of motor 18 and the keying device 15 in the signal frequency generator will be arranged to operate in synchronism with each other. Moreover, the key 42 may be arranged to open itself after a given amount of rotation of the condenser 19. For this purpose the relay arrangement shown in my copending applications Serial Nos. 174,081 and 231,390 may be used. Moreover, any other suitable means of changing the frequency of the fluctuation frequency generator 10 can be used, for example, any of the circuit arrangements shown in my copending application Serial No. 231,391. By these means the frequency generated by the device 10, Fig. 1, can be varied through predetermined limits resulting in a variation in the rate of frequency change of the frequency generator 1 and consequently also of the signal transmitted by the compressional wave transmitter 16.

Fig. 3 shows a simple form of a receiving system for receiving reflected compressional waves and producing an indication therefrom. Reflected waves are initially received by the compressional wave receiver 20 which produces electric impulses which are conducted to a signal frequency amplifier 21 as are all other compressional wave impulses which may be present in the medium. The amplified impulses are then conducted to a current limiter 25 which acts to limit the peak values of all currents to a common maximum value. A filter 26 may then be used to limit the band of frequencies passed by the amplifier to those required by the frequency band of the signals originally transmitted. Further amplification may be provided by the amplifier 27 to compensate energy loss in the filter 26. The impulses are then passed to a differential detector 28 which is responsive only to frequency changes and which produces an output current having a frequency corresponding to the rate of change of frequency of the input signal. The output frequency of the detector 28 is therefore substantially equal to the frequency of the fluctuation frequency generator in the transmitting system. Assuming this to be of an audible frequency, the output of detector 28 will therefore also be of an audible frequency. After further filtering by the filter 29 the signal is amplified by the audio amplifier 30 and conducted to an indicator, for example, the telephones 31. In this and in the modifications which follow, suitable forms of amplifiers, limiters, filters, etc., will be obvious to those skilled in the art.

By way of example, however, simple conventional forms of current limiter and differential detector have been shown in Figs. 8 and 9 of the drawing. The current limiter shown in Fig. 8 comprises an input transformer 50 whose secondary is tuned by shunt condenser 51 to the required frequency band. The limiter tube 52 may be a tetrode vacuum tube having its grid connected to one terminal of the secondary of transformer 50 and through resistance 53 to the other terminal of the secondary of transformer 50. The cathode and screen grids of the tube 52 are connected to ground. A resistance 54, shunted by a condenser 55, is connected between the secondary of transformer 50 and the cathode of tube 52. The anode circuit of the tube includes an output transformer 56 shunted by a tuning condenser 57 and connected in series with a resistance 58 which is connected to the positive terminal of the plate voltage supply, the negative terminal of the latter being grounded. The primary winding of transformer 56 is also connected through by-pass condenser 59 to ground. Another resistance 60 is connected between the screen grid and the high potential end of resistor 58. The values of resistors 54, 58 and 60 are so proportioned that the tube is operated slightly below the saturation point of the plate characteristic of the tube when no signal is present. When a signal is applied to the input of the limiter with enough intensity to drive the tube materially beyond the saturation point, amplitude variations of the input signal will cause no variation in the amplitude of the output current. Just prior to the limiter, therefore, the signal is amplified sufficiently to assure that its mean amplitude will drive the tube beyond saturation. By this means amplitude variations of the signal caused by transmission through the medium or by locally generated disturbances or both, prior to the limiter, are removed.

Fig. 9 shows a simple conventional type of differential detector. It comprises two diodes 61 and 62 whose anodes are connected to the extremities of the secondary of a transformer 63 shunted by a tuning condenser 64. The primary of transformer 63 is shunted by tuning condenser 65 and is connected across the output of the current limiter or the amplified output of the current limiter. The high potential side of the primary of transformer 63 is coupled by a condenser 66 to the mid-point of the secondary of the transformer. This mid-point is also connected by series resistance 67 to the junction of two resistors 68 and 69, each shunted by a condenser 70 and 71, respectively, and having their free ends connected to the cathodes of the tubes 61 and 62. The cathode of tube 62 is at ground potential. The primary and secondary of transformer 63 are tuned to the same frequency, which is the mean signaling frequency. The voltages across the primary and the secondary are combined by means of the center-tap connection to produce two voltages which, when rectified by the diodes 61 and 62, are added in opposing polarity. At the mean resonant frequency, the sum of these voltages is zero, while for frequencies off resonance, the resultant output voltage increases, the polarity depending upon whether the frequency is above or below the mean frequency. Thus, when the input frequency fluctuates at an audio rate above and below the mean, the circuit will generate an audio voltage of the fluctuating frequency across the output resistor combination 68 and 69.

As previously noted, the transmitted signal and the signal which is reflected from distant objects vary in frequency continuously between predetermined frequency limits and at a definite rate. It is desired to cause this signal to produce an indication to the exclusion of all other signals. The water medium, however, may and usually does contain a great many other compressional wave impulses. Some of these may be produced by reverberations of the original signal, that is by reflections from water strata of different temperature or salinity or by reflections from the ocean surface or from the bottom or in other ways. Other disturbing impulses may also be present as, for example, those produced by the motion of the ship through the water, by the action of the ship's propeller or by sounds conducted to the water through the ship's skin. The receiver eliminates many of these unwanted signals by virtue of its being sensitive only to the varying frequency characteristics of the desired signal. Impulses generated by variation of amplitude are partly eliminated by the current limiter 25. Impulses outside of the fluctuation frequency band are eliminated by the filter 26. All of the impulses except those having frequency variations are then substantially completely eliminated by the differential detector 28.

In many cases, however, it will be desirable to bring about further reduction in the ratio of undesired to desired signals by injecting into the initial amplifier output or into the output of the intermediate stages a locally generated signal having a frequency approximately equal to the mean signal frequency at that point in the receiver at which the injection is made but of an amplitude less than the signal amplitude at that point. Such a signal may be introduced into the amplifier 21 by closing switch 43 to the injection frequency generator 32. The object of this is to provide for the presence of a continuous signal when the invention is being used for echo ranging with periodically transmitted signals even while no reflected signal impulse is being received. The effect of this is to make the current limiter and the differential detector active to completely eliminate the transmission of undesired impulses generated by variations in amplitude to the indicator 31. That is, the amplitude of the injected signal is made such that when added to undesired or noise impulses present, the combined level will be such as to make the current limiter and the differential detector operative. The injected signal will not interfere with the desired reflected signal provided that the latter has an amplitude at least approximately ten per cent greater than that of the injected signal at the point in the receiving circuit at which the injection is made.

Injection of the signal is preferably made after one or more stages of amplification of the received signal in order more readily to obtain the required amplitude predominance of the latter. Thus, even though undesired signals be received by the receiver 20 while the operator is listening for an echo, all these disturbances will be eliminated to provide substantially complete silence except when the echo signal is received.

Figure 4:
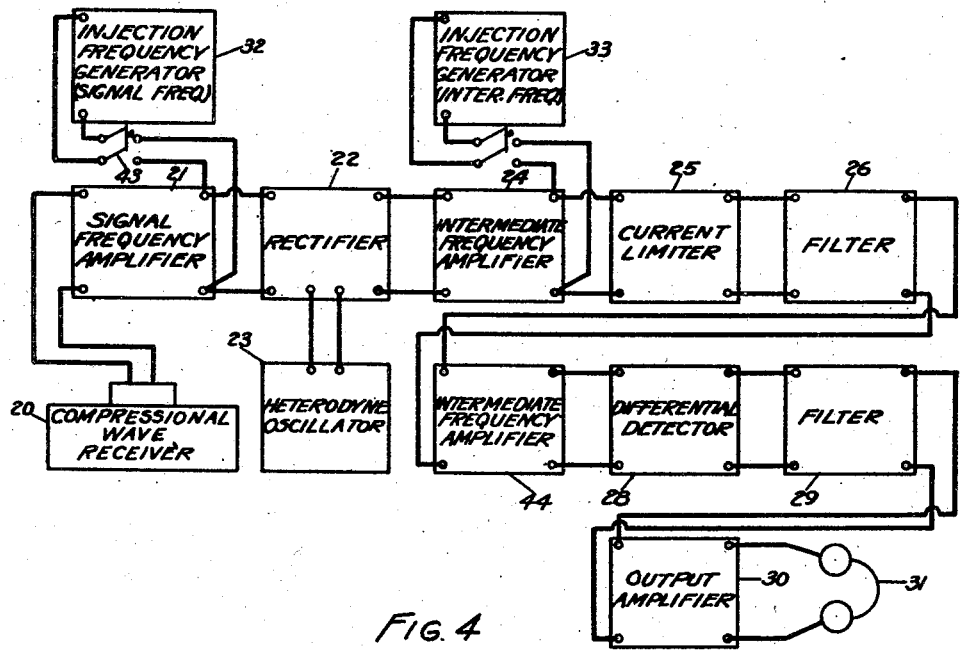

In many cases it will be found desirable to change the frequency of the received signal to some extent before passing the same through the current limiter and detector. A system modified to this extent is shown in Fig. 4. The signal is received by the compressional wave receiver 20 and amplified by the signal frequency amplifier 21 as before. The signal may then be rectified by rectifier 22 and combined with a constant frequency which may be locally generated by the heterodyne oscillator 23 producing an intermediate range of frequencies which will usually be higher than the signal frequency. After subsequent amplification by the intermediate frequency amplifier 24, the impulses are conducted to current limiter 25, filter 26, amplifier 44, differential detector 28, filter 29, output amplifier 30 and indicating telephones 31 in substantially the same manner as in the previous case. It should be noted, however, that a signal may be injected into the system from the injection frequency generator 32 by closing switch 43 after the output of the signal frequency amplifier 21, or alternatively the signal injection may take place after the intermediate frequency amplifier 24. In the latter case the frequency of the injected signal must correspond to the intermediate frequency resulting after the action of the heterodyne rectifier. Such a frequency may be generated by the injection frequency generator 33.

Figure 5:
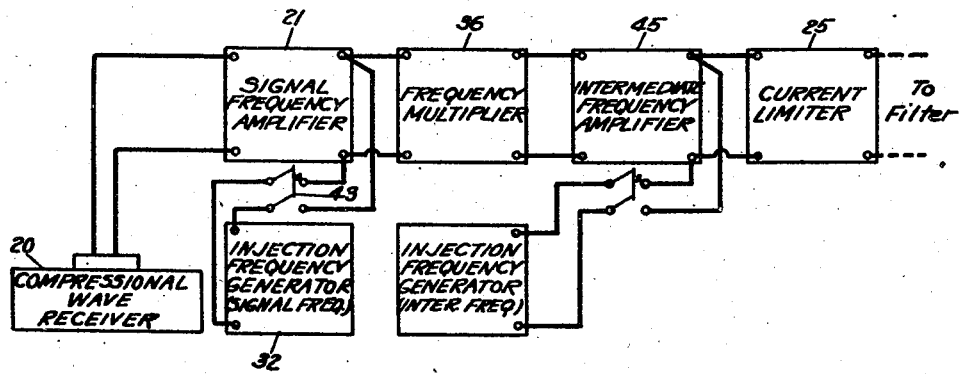

Now, due to imperfections in the current limiters and the detector, some audible noise may still reach the indicator. This can be reduced by extending the frequency band through which the signal fluctuates. The frequency band passed by the differential detector which is required to produce maximum output from the detector is usually sufficiently large to permit the use of a relatively large frequency band. On the other hand, the maximum range of compressional wave frequencies which can conveniently be used may in many cases be considerably less than the optimum frequency band of the detector so that a large range of frequency fluctuation in the transmitted signal cannot be used. This difficulty can be avoided, however, and greater over-all efficiency can be obtained by extending the frequency band in the receiver. This can readily be accomplished as shown in Fig. 5. Most of the elements here shown are similar to those shown in Fig. 4 but it will be noted that between the signal frequency amplifier 21 and the current limiter 25 there is used a frequency multiplier 36 which, in itself, may be of conventional design. The multiplier acts to multiply by a given factor all the frequencies present in the output of the signal frequency amplifier 21. By proper choice of the multiplication factor the frequency band occupied by the desired signal can then be made substantialy to fill the optimum frequency band of the differential detector. Not only does this provide maximum operating efficiency of the detector resulting in a higher signal-to-noise ratio in the output of the system, but it also acts to eliminate some of the disturbing noises which may enter the system prior to the frequency multiplier because many of these disturbing impulses will now produce in the detector output superaudible frequencies which are inaudible to the observer. The injection frequency if made after the amplifier 21 will be of signal frequency but if made after the intermediate frequency amplifier 45, it must correspond to the frequency at the output of this amplifier, i. e., the mean signal frequency as multiplied by the multiplier 36. The remainder of the system following the current limiter 25 may be similar to that of Fig. 4.

Frequency multipliers are well known in the art and the design of a suitable multiplier will be obvious to those skilled in the art. By way of example, however, a conventional multiplier circuit is shown in Fig. 10. This multiplier comprises a pair of triodes 79 and 80 operated as square-law detectors. The input transformer 73 has its secondary shunted by tuning condenser 74 and by two series-connected condensers 75 and 76 as well as by two series-connected resistors 77 and 78 whose extremities are also connected to the respective grids of the two triodes 79 and 80. The cathodes of the triodes are connected together, the common point being connected to the common point of resistors 77 and 78 by means of the grid bias resistor 81 shunted by condenser 82. The junction of resistors 77 and 78 is also connected to ground as is the negative terminal of the anode-cathode voltage supply. The anodes of the tubes 79 and 80 are connected together and to one side of the primary of output transformer 83 which is shunted by tuning condenser 84. The other end of the primary of the transformer is connected to the positive terminal of the anode voltage supply. Since the two triodes are connected in opposite phase, one will pass current during the positive half cycles of an alternating input potential while the other will pass current during the negative half cycles of the input potentials. Both of these currents, however, will flow through the transformer 83 in the same direction resulting, in the secondary of the transformer, in an alternating current of twice the frequency of the input signal. Any harmonic content of the output signal is filtered out by the action of subsequent tuned circuits. As many stages of multiplication may be used as desired. For the purposes of the present invention approximately five such double stages, giving a total frequency multiplication of thirty-two, will usually be found to be ample.

Figure 6:
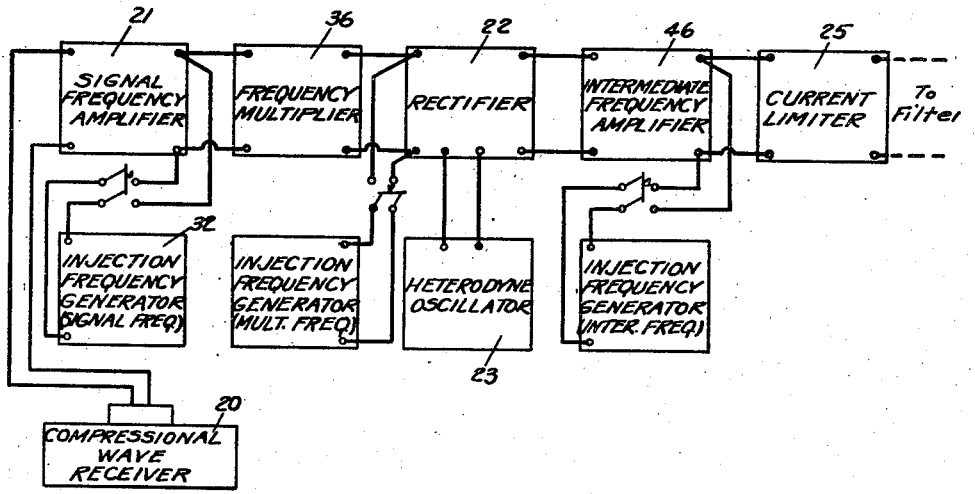

In the modification shown in Fig. 6 the signal frequency impulses after being multiplied in frequency are passed through the rectifier 22 and combined with locally generated currents from the heterodyne oscillator 23 in much the same manner as shown in Fig. 4, but the frequency of the oscillator 23 will, of course, be chosen with due regard to the width of the frequency band of the desired signal after heterodyning. In this arrangement there are optional places at which the injection of a signal can be made, namely after the signal frequency amplifier 21, after the frequency multiplier 36 or after the intermediate frequency amplifier 46. The remainder of the system may be similar to that shown in Fig. 4.

While, as has been stated, it will be desirable in most cases to choose a fluctuation frequency for the signal impulse which is within the audible range, it may nevertheless in some cases be desirable to choose a fluctuation frequency in the supersonic range. If this be done, greater secrecy can be obtained, for ordinary supersonic amplifiers and receivers will not produce an audible output. Therefore, in this case in order to make the output signal audible, the system following the differential detector 28 must be modified as shown in Fig. 7. The differentially detected signal, being of supersonic frequency, is amplified by the supersonic amplifier 47 after which it is passed to a detector 48 and combined with locally generated currents of a fixed frequency produced by heterodyne oscillator 49 to produce an audible output frequency which can be amplified by the audio amplifier 30 before being passed to the indicator 31.

Where the fluctuation frequency is maintained constant, the signal heard in the telephone indicator 31 will correspondingly be of a constant frequency. Where reverberations are very troublesome, the fluctuation frequency can be varied in the transmitter as by the device 17, Fig. 1. In this case the signal heard in the telephones will correspondingly change in frequency.

By way of example, using the receiving system of Fig. 4, the transmitted compressional wave signal frequency might be chosen at 25 kilocycles mean frequency fluctuating 800 to 1000 times per second between 20 kilocycles and 30 kilocycles. Using a heterodyne oscillator of 150 kilocycles, the mean intermediate frequency becomes 175 kilocycles, the band width still being 10 kilocycles, namely from 170 to 180 kilocycles. This leaves the 150 kilocycle frequency of the heterodyne oscillator well outside of the pass band of the intermediate frequency amplifiers. The injected signal, if introduced after the signal frequency amplifier 21, would have a frequency of 25 kilocycles, or if made after the intermediate frequency amplifier 24, the injected signal would have a frequency of 175 kilocycles.

On the other hand, as an example of the case where a frequency multiplier is used as in Fig. 6, the transmitted and received compressional wave signal may still have a mean frequency of 25 kilocycles fluctuating between 20 and 30 kilocycles. Using a multiplier factor of 5, it will be observed that the mean signal frequency becomes 125 kilocycles and the frequency fluctuations will extend from 100 kilocycles to 150 kilocycles, that is, the signal frequency band is now 50 kilocycles wide. It is desirable for this reason to use a relatively high intermediate frequency, for it is easier to obtain the necessary band width in the amplifiers at the higher frequencies and it is also easier then to obtain a signal frequency band which leaves the heterodyne oscillator frequency outside of the band. Thus, the heterodyne oscillator frequency may be chosen at 1475 kilocycles or higher, giving an intermediate mean signal frequency of 1600 kilocycles or higher. The injected signal, if introduced after the signal frequency amplifier 21, will, of course, have a frequency of 25 kilocycles as in the previous example. If made after the frequency multiplier, the injected signal should have a frequency of 125 kilocycles, while if made after the intermediate frequency amplifier 46, it should have a frequency of 1600 kilocycles or higher, depending upon the mean signal frequency at that point in the system.

It may be of assistance in understanding the invention to consider briefly the various types of disturbing noises which enter into echo ranging systems of the type referred to in the introduction to this specification, namely, in which the distance of remote objects is determined by measuring the time interval between transmitted and reflected compressional wave impulses which are transmitted periodically in synchronism with a timing device. Considering, first, the case where no signal is being received by the receiver and no constant frequency signal is injected into the receiving system, there will be three sources of noise present which will tend to produce sounds in the indicating telephones 31. These are (1) beats between disturbing impulses arising either in the medium or in the receiving apparatus and having different frequencies; (2) shock excitation of some of the tuned circuits by steep wave front, high amplitude noise impulses; and (3) the simulation of a frequency modulated signal by successive noise impulses. A fourth source of noise occurs when there is a signal present by the beating of noise frequencies with the signal. It will be understood that in general the disturbing noises of whatever origin may have any frequency and they may, of course, occur at any instant of time. Usually all frequencies are present more or less all the time; such noise is often called "spectrum noise" and consists nearly all of amplitude modulated impulses. The noise impulses which are outside of the pass band of the receiving system are, of course, eliminated by the tuned circuits.

The current limiter will serve to reduce the voltage amplitude to the limiter saturation value for all impulses whose initial amplitude was greater than this value. With no signal present, this function does not appreciably reduce noise. However, if a signal is present or if a signal of constant frequency corresponding to the mean signaling frequency is injected into the receiving system as above described, and this injected signal is given an amplitude sufficient to cause the current limiter to pass its maximum, saturation current, noises picked up from the signaling medium or generated in prior amplifier stages will act to modulate the injected signal. If the latter has a RMS value which is always greater than that of the noise, the fundamental frequency of the noise modulated signal will be that of the original signal. The side band frequency will be plus or minus the beat frequencies between the various noise frequencies and the injected signal frequency within the limits of the band pass of the amplifier stages. Now, since the limiter will pass maximum current even with the injected signal alone, it is obvious that variations of the signal amplitudes caused by modulation by the noise impulses will not cause corresponding variations in the output of the limiter. Thus, the current limiter acts to eliminate noise resulting from amplitude modulation of the signal by noises in the medium, whether the signal in question is a reflected frequency modulated signal or an injected single frequency signal. The injected signal frequency being of a constant single frequency will only produce a constant direct current in the output in the detector and will therefore not be passed on to the audio stages.

Since the current limiter acts only to eliminate noise which produces amplitude modulation of a signal, some spectrum noise may nevertheless reach the differential detector. This is particularly true when no signal is present in the receiving system as in the intervals between receipt of the periodic reflected signal impulses or when there is no reflecting object within range of the equipment and no injected signal is used. Every impulse of whatever frequency within the pass band of the detector will produce an output current in the detector circuit. But since spectrum noise, as above defined, contains substantially all frequencies and since the output of the two diodes of the detector are in opposition to each other, the output currents due to spectrum noise will in a large measure cancel out. The differential detector, therefore, acts to eliminate spectrum noise.

When no signal is present in the receiving system, further noise reduction is obtained by using multipliers prior to the detector. Without the multipliers, the beats produced between some noise frequencies and other noise frequencies may produce currents within the audible range in the detector output. Such beats will, therefore, be heard as noise by an observer listening at the telephones. The multiplier, however, by expanding the received frequency range raises many of these beat frequencies to a value where they will produce in the detector output only superaudible frequencies so that an observer at the telephones can not hear them.

It will be observed that the above discussion relates only to noises which occur at random time intervals. There still exist noises designated by the term "reverberations" which are believed to be produced by periodic reflection of the transmitted signal or a portion of the transmitted signal from more or less stationary reflecting surfaces existing in the medium. Noises of this character are not eliminated by the limiter, multiplier or detector since they will have the frequency-varying characteristic which is possessed by the signal itself. To eliminate such reverberation noises I use, as pointed out above, a variation of the rate at which the transmitted signal varies in frequency within its band, this variation continuing during the entire length of the transmitted signal impulse. This means that the audible signal which is obtained at the output of the receiving system varies continuously in frequency. It becomes, therefore, more unlikely that reflecting surfaces in the medium will be so positioned that in the aggregate they can return to the receiver a signal varying in frequency in the same manner as the transmitted signal.

It will be understood by those skilled in the art that it is not essential to use separate compressional wave devices for transmitting and receiving, but that frequently the same unit can be used for both purposes.

Having now described my invention, I claim:

1. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, detecting the frequency variations of said electric impulses to produce currents of a periodicity proportional to that of said frequency variations and causing said currents to produce an indication, whereby the effect of said disturbing impulses is reduced.

2. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits at a fixed rate, receiving during said elapsed time interval disturbing impulses present in the medium and eventually the reflected impulse to produce corresponding electric impulses, detecting the frequency variations of said electric impulses to produce currents of a periodicity proportional to that of said frequency variations and causing said currents to produce an indication, whereby the effect of said disturbing impulses is reduced.

3. In a method of echo ranging with underwater compressional waves by measuring the elapsed time interval between a transmitted impulse and the deflection thereof from an object whose distance is to be determined, the steps of transmitting a compressional wave signal impulse of short time duration compared to the time intervals being measured, said signal impulse continuously and periodically varying in frequency between predetermined frequency limits at a continuously varying rate and the said rate varying between predetermined limits, receiving during said elapsed time intervals disturbing impulses present in the medium and eventually the reflected impulse to produce corresponding electric impulses, detecting the frequency variations of said electric impulses to produce currents of a periodicity proportional to that of said frequency variations and causing said currents to produce an indication, whereby the effect of said disturbing impulses is reduced.

4. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, combining with said electric impulses by heterodyne action locally generated electric impulses of a constant frequency, then detecting the frequency variations of the combined electric impulses to produce currents of a periodicity proportional to that of said frequency variations and causing said currents to produce an indication, whereby the effect of said disturbing impulses is reduced.

5. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, combining with said electric impulses locally generated electric impulses of a frequency substantially equal to the mean frequency of the reflected impulse at the point of combination and of a magnitude small compared to the magnitude of the reflected impulse at the point of combination, then detecting the frequency variations of the combined impulses to produce currents of a periodicity proportional to that of said frequency variations and causing said currents to produce an indication, whereby the effect of said disturbing impulses is reduced.

6. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, multiplying the frequency of said electric impulses by a substantially fixed factor, detecting the frequency variations of the resulting electric impulses to produce currents of a periodicity proportional to that of said frequency variations and causing said currents to produce an indication, whereby the effect of said disturbing impulses is reduced.

7. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, limiting the maximum value of all impulses to a definite maximum amplitude, detecting the frequency variations of said electric impulses to produce currents of a periodicity proportional to that of said frequency variations and causing said currents to produce an indication, whereby the effect of said disturbing impulses is reduced.

8. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse being of a supersonic frequency and continuously and periodically varying in frequency between predetermined frequency limits at an audio frequency, receiving during said elapsed time interval disturbing impulses present in the medium and eventually the reflected impulse to produce corresponding electric impulses, detecting the frequency variations of said electric impulses to produce currents of a periodicity proportional to said frequency variations, whereby said reflected impulse will appear as an audio frequency signal of a frequency proportional to said first-mentioned audio frequency and causing said audio frequency signal to produce an indication.

9. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse having a supersonic frequency and continuously and periodically varying in frequency between predetermined limits at a supersonic frequency, receiving during said elapsed time interval disturbing impulses present in the medium and eventually the reflected impulse to produce corresponding electric impulses, detecting the frequency variations of said electric impulses to produce currents of a periodicity proportional to that of said frequency variations, whereby the reflected impulse will appear as a supersonic frequency signal proportional to said second-mentioned supersonic frequency, then combining said currents with locally generated currents of a fixed frequency by heterodyne action, whereby said reflected impulses appears as an audio frequency signal, and causing the latter to produce an indication.

10. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, combining with said electric impulses by heterodyne action locally generated electric impulses of a constant frequency, further combining with said impulses locally generated electric impulses of a frequency substantially equal to the mean frequency of the desired reflected signal impulse at the point of combination and of an amplitude small compared to the amplitude of said desired reflected signal at the point of combination, limiting the maximum values of all the combined electric impulses to a definite maximum amplitude, then detecting the frequency variations of the combined electric impulses to produce currents of a periodicity proportional to that of said frequency variations and causing said currents to produce an indication, whereby the effect of said disturbing impulses is reduced.

11. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, combining with said electric impulses by heterodyne action locally generated electric impulses of a frequency substantially equal to the mean frequency of the reflected impulses, limiting the maximum values of all of said combined electric impulses to a definite maximum amplitude, detecting the frequency variations of the combined electric impulses to produce currents of a periodicity proportional to that of said frequency variations, and causing said currents to produce an indication, whereby the effect of said disturbing impulses is reduced.

12. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency between predetermined frequency limits, receiving during said elapsed time interval disturbing impulses present in the medium and eventually the reflected impulse to produce corresponding electric impulses, multiplying the frequency of said electric impulses by a substantially fixed factor, combining with said electric impulses by heterodyne action locally generated electric impulses of a substantially constant frequency of a value such that said constant frequency will fall outside of the band occupied by the desired reflected signal impulses after said combination, then detecting the frequency variations of said electric impulses to produce currents of a periodicity proportional to that of said frequency variations and causing said currents to produce an indication, whereby the effect of said disturbing impulses is reduced.

13. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency back and forth through a frequency band extending approximately 20 percent of the mean frequency on both sides thereof, receiving during said elapsed time interval disturbing impulses present in the medium and eventually the reflected impulse to produce corresponding electric impulses, detecting the frequency variations of said electric impulses to produce currents of a periodicity proportional to that of said frequency variations and causing said currents to produce an indication, whereby the effect of said disturbing impulses is reduced.

14. In a method of echo ranging with underwater compressional waves by measuring the elapsed time interval between a transmitted impulse and the reflection thereof from an object whose distance is to be determined, the steps of transmitting a compressional wave signal impulse of short time duration compared to the time intervals being measured, said signal impulse continuously and periodically varying in frequency back and forth through a frequency band having a relatively limited width, receiving during said elapsed time interval disturbing impulses present in the medium and eventually the reflected impulse to produce corresponding electric impulses, multiplying the frequencies of said electric impulses by a constant factor, detecting the frequency variations of said electric impulses within a frequency band limited substantially to the frequency band occupied by the desired reflected signal after said frequency multiplication to produce currents of a periodicity proportional to that of said frequency variations and causing said currents to produce an indication, whereby the effect of said disturbing impulses is reduced.

15. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for detecting the frequency variations of said electric impulses to produce currents of a periodicity proportional to that of said frequency variations and means for causing said currents to produce an indication whereby the effect of said disturbing impulses is reduced.

16. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits at a fixed rate, means for receiving during said elapsed time interval disturbing impulses present in the medium and eventually the reflected impulse to produce corresponding electric impulses, means for detecting the frequency variations of said electric impulses to produce currents of a periodicity proportional to that of said frequency variations, and means for causing said currents to produce an indication, whereby the effect of said disturbing impulses is reduced.

17. In a system of echo ranging with underwater compressional waves by measuring the elasped time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits at a continuously varying rate and the said rate varying between predetermined limits, means for receiving during said elapsed time interval disturbing impulses present in the medium and eventually the reflected impulse to produce corresponding electric impulses, means for detecting the frequency variations of said electric impulses to product currents of a periodicity proportional to that of said frequency variations, and means for causing said currents to produce an indication, whereby the effect of said disturbing impulses is reduced.

18. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for combining with said electric impulses by heterodyne action locally generated electric impulses of a constant frequency, means for detecting the frequency variations of the combined electric impulses to produce currents of a periodicity proportional to that of said frequency variations, and means for causing said currents to produce an indication, whereby the effect of said disturbing impulses is reduced.

19. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for combining with said electric impulses locally generated electric impulses of a frequency substantially equal to the mean frequency of the reflected impulse at the point of combination and of a magnitude small compared to the magnitude of the reflected impulse at the point of combination, means for detecting the frequency variations of the combined impulses to produce currents of a periodicity proportional to that of said frequency variations, and means for causing said currents to produce an indication, whereby the effect of said disturbing impulses is reduced.

20. In a system of echo ranging with underwater compressional waves by measuring the elasped time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for multiplying the frequency of said electric impulses by a substantially fixed factor, means for detecting the frequency variations of the resulting electric impulses to produce currents of a periodicity proportional to that of said frequency variations and means for causing said currents to produce an indication, whereby the effect of said disturbing impulses is reduced.

21. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for limiting the maximum value of all impulses to a definite maximum amplitude, means for detecting the frequency variations of said electric impulses to produce currents of a periodicity proportional to that of said frequency variations, and means for causing said currents to produce an indication, whereby the effect of said disturbing impulses is reduced.

22. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse being of a supersonic frequency and continuously and periodically varying in frequency between predetermined frequency limits at an audio frequency, means for receiving during said elapsed time interval disturbing impulses present in the medium and eventually the reflected impulse to produce corresponding electric impulses, means for detecting the frequency variations of said electric impulses to produce currents of a periodicity proportional to said frequency variations, whereby said reflected impulse will appear as an audio frequency signal of a frequency proportional to said first-mentioned audio frequency, and means for causing said audio frequency signal to produce an indication.

23. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse having a supersonic frequency and continuously and periodically varying in frequency between predetermined limits at a supersonic frequency, means for receiving during said elapsed time interval disturbing impulses present in the medium and eventually the reflected impulse to produce corresponding electric impulses, means for detecting the frequency variations of said electric impulses to produce currents of a periodicity proportional to that of said frequency variations, whereby the reflected impulse will appear as a supersonic frequency signal proportional to said second-mentioned supersonic frequency, means for combining said currents with locally generated currents of a fixed frequency by heterodyne action, whereby said reflected impulse appears as an audio frequency signal, and means for causing the latter to produce an indication.

24. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for combining with said electric impulses by heterodyne action locally generated electric impulses of a constant frequency, means for further combining with said impulses locally generated electric impulses of a frequency substantially equal to the mean frequency of the desired reflected signal impulse at the point of combination and of an amplitude small compared to the amplitude of said desired reflected signal at the point of combination, means for limiting the maximum values of all the combined electric impulses to a definite maximum amplitude, means for detecting the frequency variations of the combined electric impulses to produce currents of a periodicity proportional to that of said frequency variations, and means for causing said currents to produce an indication, whereby the effect of said disturbing impulses is reduced.

25. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for combining with said electric impulses by heterodyne action locally generated electric impulses of a frequency substantially equal to the mean frequency of the reflected impulses, means for limiting the maximum values of all of said combined electric impulses to a definite maximum amplitude, means for detecting the frequency variations of the combined electric impulses to produce currents of a periodicity proportional to that of said frequency variations, and means for causing said currents to produce 26. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency between predetermined frequency limits, means for receiving during said elapsed time interval disturbing impulses present in the medium and eventually the reflected impulse to produce corresponding electric impulses, means for multiplying the frequency of said electric impulses by a substantially fixed factor, means for combining with said electric impulses by heterodyne action locally generated electric impulses of a substantially constant frequency of a value such that said constant frequency will fall outside of the band occupied by the desired reflected signal impulses after said combination, means for detecting the frequency variations of said electric impulses to produce currents of a periodicity proportional to that of said frequency variations, and means for causing said currents to produce an indication, whereby the effect of said disturbing impulses is reduced.

27. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency back and forth through a frequency band extending approximately 20 percent of the mean frequency on both sides thereof, means for receiving during said elapsed time interval disturbing impulses present in the medium and eventually the reflected impulse to produce corresponding electric impulses, means for detecting the frequency variations of said electric impulses to produce currents of a periodicity proportional to that of said frequency variations, and means for causing said currents to produce an indication, whereby the effect of said disturbing impulses is reduced.

28. In a system of echo ranging with underwater compressional waves by measuring the elapsed time interval between a transmitted impulse and the reflection thereof from an object whose distance is to be determined, the combination of means for transmitting a compressional wave signal impulse of short time duration compared to the time intervals being measured, said signal impulse continuously and periodically varying in frequency back and forth through a frequency band having a relatively limited width, means for receiving during said elapsed time interval disturbing impulses present in the medium and eventually the reflected impulse to produce corresponding electric impulses, means for multiplying the frequencies of said electric impulses by a constant factor, means for detecting the frequency variations of said electric impulses within a frequency band limited substantially to the frequency band occupied by the desired reflected signal after said frequency multiplication to produce currents of a periodicity proportional to that of said frequency variations, and means for causing said currents to produce an indication, whereby the effect of said disturbing impulses is reduced.

29. Apparatus for receiving a compressional wave signal impulse continuously and periodically varying in frequency and having a relatively short time duration in a medium in which disturbing noises are present comprising a compressional wave receiver adapted to produce electric impulses corresponding to received compressional wave impulses, means for amplifying said electric impulses, means for combining said electric impulses with locally generated electric impulses having a frequency substantially equal to the mean frequency at the point of combination of the signal impulse desired to be received and of an amplitude small compared to the same, means for detecting frequency variations of the combined electric impulses to produce currents of a periodicity proportional to that of said frequency variations, and means for causing said currents to produce an indication.

30. Method of signaling under water with discrete compressional wave impulses having appreciable time intervals between them comprising transmitting discrete compressional wave signal impulses of relatively short time duration, said signal impulses continuously and periodically varying in frequency between predetermined frequency limits, continuously receiving from the medium disturbing impulses present in the medium and from time to time said transmitted signal impulses to produce corresponding electric impulses, detecting the frequency variations of said electric impulses to produce currents of a periodicity proportional to that of said frequency variations and causing said currents to produce an indication whereby the effect of said disturbing impulses is reduced.

31. Method of signaling underwater with discrete compressional wave impulses having appreciable time intervals between them comprising transmitting discrete compressional wave signal impulses of relatively short time duration, said signal impulses continuously and periodically varying in frequency between predetermined frequency limits, continuously receiving from the medium disturbing impulses present in the medium and from time to time said transmitted signal impulses to produce corresponding electric impulses, limiting the amplitude of all said electric impulses to a uniform value, detecting the frequency variations of said electric impulses to produce currents of a periodicity proportional to that of said frequency variations and causing said currents to produce an indication whereby the effect of said disturbing impulses is reduced.

32. Method of signaling underwater with discrete compressional wave impulses having appreciable time intervals between them comprising transmitting discrete compressional wave signal impulses of relatively short time duration, said signal impulses continuously and periodically varying in frequency between predetermined frequency limits, continuously receiving from the medium disturbing impulses present in the medium and from time to time said transmitted signal impulses to produce corresponding electric impulses, multiplying the frequencies of said electric impulses by a substantially fixed factor, limiting the amplitude of all the multiplied electric impulses to a uniform value, detecting the frequency variations of said electric impulses to produce currents of a periodicity proportional to that of said frequency variations and causing said currents to produce an indication whereby the effect of said disturbing impulses is reduced.

BERTRAM M. HARRISON.

REFERENCES CITED

The following references are of record in the file of this patent:

UNITED STATES PATENTS

| Number | Name | Date |
|---|---|---|
| 2,121,103 | Seeley | Jan. 21, 1938 |
| 2,060,142 | Urtel et al. | Nov. 10, 1936 |
| 2,203,857 | Beers | June 11, 1940 |
| 2,134,033 | Crosby | Oct. 25, 1938 |
| 2,222,586 | Sanders, Jr. | Nov. 19, 1940 |
| 2,236,893 | Chaffee | Apr. 1, 1941 |
| 1,677,191 | Loynes | July 17, 1928 |
| 1,830,166 | Hansell | Nov. 3, 1931 |
| 2,118,518 | Neumann | May 24, 1938 |
| 1,807,658 | Godsey, Jr. | June 2, 1931 |
| 1,501,105 | Fessenden | July 15, 1924 |

FOREIGN PATENTS

| Number | Country | Date |
|---|---|---|
| 312,962 | Great Britain | June 4, 1929 |

OTHER REFERENCES

"A Direct-Reading ... Altimeter ...," Matsuo, Proc. I. R. E., July 1938, pp. 848–858.

"A Method ... of Frequency Modulation," Armstrong, Proc. I. R. E., May 1936, pp. 689–716.

Wireless World, Aug. 11, 1938, pp. 112–114.

(Copies in Div. 51).